United States Patent
Ernst

(10) Patent No.: US 10,125,692 B2
(45) Date of Patent: Nov. 13, 2018

(54) GAS TURBINE ENGINE SYSTEM HAVING A DISENGAGEABLE ELECTRIC MACHINE

(71) Applicants: Rolls-Royce Corporation, Indianapolis, IN (US); Laura Williams Ernst, Carmel, IN (US)

(72) Inventor: James W. Ernst

(73) Assignee: Rolls-Royce Corporation, Indianapolis, IN (US)

(*) Notice: Subject to any disclaimer, the term of this patent is extended or adjusted under 35 U.S.C. 154(b) by 491 days.

(21) Appl. No.: 14/819,097

(22) Filed: Aug. 5, 2015

(65) Prior Publication Data

US 2016/0053691 A1 Feb. 25, 2016

Related U.S. Application Data

(60) Provisional application No. 62/040,684, filed on Aug. 22, 2014.

(51) Int. Cl.
| | | |
|---|---|---|
| *F02C 7/32* | (2006.01) | |
| *F01D 15/10* | (2006.01) | |
| *F02C 7/22* | (2006.01) | |
| *F02C 9/28* | (2006.01) | |

(Continued)

(52) U.S. Cl.
CPC ............. *F02C 7/32* (2013.01); *F01D 15/10* (2013.01); *F02C 3/107* (2013.01); *F02C 6/20* (2013.01); *F02C 7/22* (2013.01); *F02C 9/28* (2013.01); *F05D 2220/32* (2013.01); *F05D 2220/323* (2013.01); *F05D 2260/40* (2013.01); *F05D 2260/4023* (2013.01); *F05D 2260/42* (2013.01);

(Continued)

(58) Field of Classification Search
CPC .... F02C 7/22; F02C 7/32; F02C 3/107; F02C 6/20; F02C 9/28; F05D 2260/4023; F05D 2260/40; F05D 2220/32; F05D 2270/335; F05D 2270/05; F01D 15/10
See application file for complete search history.

(56) References Cited

U.S. PATENT DOCUMENTS 2,949,731 A * 8/1960 Hambling ............... F02C 7/32
290/2
3,696,612 A * 10/1972 Berman .................. F02C 7/26
60/39.281

(Continued)

FOREIGN PATENT DOCUMENTS

| DE | 3502578 A1 | 7/1986 |
| EP | 2728141 A1 | 5/2014 |

(Continued)

OTHER PUBLICATIONS

Extended European Search Report, European Application No. 15181010.8-1607, dated Jan. 21, 2016, 9 pages.

(Continued)

*Primary Examiner* — Carlos A Rivera
(74) *Attorney, Agent, or Firm* — Barnes & Thornburg LLP

(57) ABSTRACT

A gas turbine engine system includes a gas turbine engine, an electric machine, a fuel pump, and a clutch arranged to selectively couple and decouple the electric machine and the fuel pump with the gas turbine engine. Control circuitry may control the clutch in response to data signals indicating engine operating information, current operating conditions, and/or other information.

19 Claims, 6 Drawing Sheets

(51) Int. Cl.
*F02C 3/107* (2006.01)
*F02C 6/20* (2006.01)

(52) U.S. Cl.
CPC ...... *F05D 2260/84* (2013.01); *F05D 2270/05* (2013.01); *F05D 2270/335* (2013.01)

(56) References Cited

U.S. PATENT DOCUMENTS

| | | | | |
|---|---|---|---|---|
| 3,835,642 | A | * | 9/1974 | Amann ................. B64D 13/06 417/319 |
| 3,965,673 | A | * | 6/1976 | Friedrich ............... B64D 13/06 60/39.15 |
| 4,729,218 | A | * | 3/1988 | Haselbauer ............ F01D 15/10 60/734 |
| 4,912,921 | A | | 4/1990 | Rice et al. |
| 5,118,258 | A | * | 6/1992 | Martin .................... F02C 7/236 417/3 |
| 5,555,722 | A | | 9/1996 | Mehr et al. |
| 5,722,228 | A | * | 3/1998 | Lampe ................... F02C 7/26 60/778 |
| 6,836,086 | B1 | * | 12/2004 | Goldberg ................ F02C 7/26 318/139 |
| 6,912,837 | B2 | | 7/2005 | Demers |
| 6,931,856 | B2 | | 8/2005 | Belokon et al. |
| 7,040,082 | B2 | * | 5/2006 | Bouiller ................. F01D 15/08 60/39.08 |
| 7,552,582 | B2 | | 6/2009 | Eick et al. |
| 7,584,600 | B2 | | 9/2009 | Klingels |
| 7,805,947 | B2 | | 10/2010 | Moulebhar |
| 7,895,819 | B2 | * | 3/2011 | Deldalle ................ F01D 15/08 417/16 |
| 8,276,360 | B2 | * | 10/2012 | Poisson .................. F01D 19/00 60/39.281 |
| 9,546,599 | B2 | * | 1/2017 | Lindeman ............... F01D 15/08 |
| 2014/0241906 | A1 | * | 8/2014 | Jan ......................... F01D 15/08 417/53 |

FOREIGN PATENT DOCUMENTS

FR 2983248 A1 5/2013
GB 988817 A 4/1965

OTHER PUBLICATIONS

European Official Action dated Jun. 8, 2018 issued in connection with European Patent Appln. No. 15181010.8; 6 pages.

\* cited by examiner

GAS TURBINE ENGINE SYSTEM HAVING A DISENGAGEABLE ELECTRIC MACHINE

CROSS-REFERENCE TO RELATED APPLICATIONS

This application claims the benefit of and priority to U.S. Provisional Patent Application Ser. No. 62/040,684, filed Aug. 22, 2014, which is incorporated herein by this reference in its entirety.

FIELD OF THE DISCLOSURE

The present disclosure relates generally to gas turbine engines for aerospace applications. More specifically, the present disclosure relates to the use of electric machines for power distribution in aerospace applications of gas turbine engines.

BACKGROUND

Gas turbine engines are used to power aircraft, watercraft, power generators, and the like. Gas turbine engines typically include one or more compressors, a combustor, and one or more turbines. In typical aerospace applications, a fan or propeller is used to draw air into the engine and feeds the drawn-in air to the gas turbine core. The compressor includes alternating stages of rotating blades and static vanes, which increase the pressure of the drawn-in air as it travels through the gas turbine core. The compressor thus outputs higher-pressure air, which it delivers to the combustor. A fuel pump supplies pressurized fuel (such as kerosene) to the combustor, typically via one or more fuel injectors. In the combustor, the fuel is mixed with the higher-pressure air and is ignited by an igniter. The products of the combustion reaction that occurs in the combustor (e.g., hot gas) are directed into a turbine. The turbine is typically made up of an assembly of discs with blades, which are attached to turbine shafts, nozzle guide vanes, casings, and other structures. The turbine converts the thermal energy supplied by the combustion products into kinetic energy. The work extracted from the combustion products by the turbine may be used to drive the fan, the compressor, and, sometimes, an output shaft. Leftover products of the combustion are exhausted out of the engine and may provide thrust in some configurations.

Aerospace applications of gas turbine engines include turboshaft, turboprop, and turbofan engines. In typical aerospace applications, the gas turbine engine provides thrust to propel the aircraft, and also supplies power for engine accessories and aircraft accessories. Typical engine accessories include an engine control unit, a starter, fuel pumps, oil pumps, etc. Typical aircraft accessories include hydraulic pumps and electric generators to supply hydraulic and/or electrical power to the aircraft cabin and/or aircraft electrical systems.

The gas turbine engine provides thrust via the main engine shafting, which is driven by the turbine as a result of the combustion reaction. The gas turbine engine also powers engine accessories and aircraft accessories by one or more accessory drives, as further explained below. Some gas turbine engines also output bleed air, which is compressed air produced by the compressor but not delivered to the combustor. Bleed air can be used by the engine to, for example, generate propulsion thrust, drive a pneumatic actuator or provide engine cooling, or may be supplied to the aircraft for cabin pressurization or other purposes.

Mechanical power is transferred from turbines to compressors through shaft and spline systems, with bearings providing axial and radial positioning of the rotating components. A central shaft (which may be referred to as a "main" shaft, a "main drive," or a "mainline" shaft, for example) typically links the turbine and compressor sections of the turbine engine. In turbine engines having multiple turbine and compressor sections, there may be multiple, concentric, independently rotatable shafts. For example, a high pressure shaft may link a high pressure compressor with a high pressure turbine, while a low pressure shaft links the fan with a low pressure turbine. The low pressure shaft may be concentric with and disposed within the high pressure shaft. In order to extract power from the turbine engine to drive the engine and aircraft accessories, one or more mechanical or electrical "accessory" drives transmit power from the engine mainline shafts to the engine and aircraft accessories. For example, a bevel gear, alone or in combination with other components (such as a stub shaft, idler, spur gears and splines), may be driven by a mainline shaft. The bevel gear may drive an accessory gearbox, which in turn runs the engine accessories and/or aircraft accessories. During engine start-up, an accessory drive can be used "in reverse" to transmit power from a starter to the engine.

Classic "power take-off" systems include mechanical drives that transmit power from the gears mounted on the engine mainline shafts to an accessory gearbox to drive accessories such as pumps and generators. However, the conventional accessory gearbox can be replaced by "more electric" systems that have embedded electrical starter/motor/generators mounted directly on the engine mainline shafts. Power electronics can convert the variable frequency electrical power that the engine delivers into alternating current (AC) or direct current (DC) as need by the engine and aircraft accessories.

SUMMARY

The present application discloses one or more of the features recited in the appended claims and/or the following examples which, alone or in any combination, may comprise patentable subject matter.

According to the present disclosure, a turbine engine system for an aircraft may include a gas turbine engine; an electric machine coupled to the gas turbine engine; a fuel pump coupled to the electric machine; and a clutch. The clutch may be configured to selectively couple and decouple the electric machine and the fuel pump from the gas turbine engine.

In some embodiments, the turbine engine system may also include a gearbox coupled to the gas turbine engine. The electric machine and the fuel pump may be coupled to the gearbox by the clutch. The clutch may be coupled to the electric machine. The clutch may be coupled to the fuel pump.

In some embodiments, the turbine engine system may include control circuitry in communication with the gas turbine engine and the clutch. The control circuitry may control the clutch in response to a data signal received from the gas turbine engine. The control circuitry may be configured to engage the clutch in response to an electrical failure in the turbine engine system. The control circuitry may be configured to disengage the clutch in response to a data signal indicative of a level of power demanded by the turbine engine system being less than a threshold power level. The control circuitry may be configured to selectively engage and disengage the clutch based on a level of power demanded by the turbine engine system. The control circuitry may be configured to selectively control the clutch in response to a change in an operating phase of the turbine engine.

In some embodiments, the electric machine may be arranged to drive the fuel pump when the clutch is disengaged. The electric machine may be arranged to transfer electrical energy from the gas turbine engine to an energy storage device. The electric machine may be arranged to transfer electrical energy from the energy storage device to the gas turbine engine when the clutch is engaged.

In some embodiments, the clutch, the electric machine, and the fuel pump may be arranged for the fuel pump to be operable independently of the gas turbine engine.

In some embodiments, the turbine engine system may include control circuitry in communication with the gas turbine engine and the clutch. The control circuitry may be configured to: (i) disengage the clutch and cause the electric machine to power the fuel pump when the clutch is disengaged, (ii) engage the clutch and cause the electric machine to supply power to the gas turbine engine when the clutch is engaged, and (iii) engage the clutch and cause the gas turbine engine to supply power to the fuel pump and the electric machine when the clutch is engaged.

According to another aspect of the present disclosure, an accessory subsystem for a gas turbine engine is taught. The accessory subsystem may include a power take-off assembly drivable by a main shaft of the gas turbine engine; a clutch coupled to the power take-off assembly; an electric machine; and a fuel pump coupled to the electric machine. The clutch may be arranged to selectively couple and decouple the electric machine and the fuel pump from the main shaft of the gas turbine engine.

In some embodiments, the clutch may be connected to the electric machine. The clutch may be connected to the fuel pump.

In some embodiments, the accessory subsystem may include control circuitry. The control circuitry may be configured to control the clutch in response to a data signal received from the gas turbine engine. The control circuitry may be configured to engage the clutch in response to an electrical failure in the turbine engine system. The control circuitry may be configured to engage and disengage the clutch in response to changes in a power level demanded by the gas turbine engine.

These and other features of the present disclosure will become more apparent from the following description of the illustrative embodiments.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION

Figure 1:
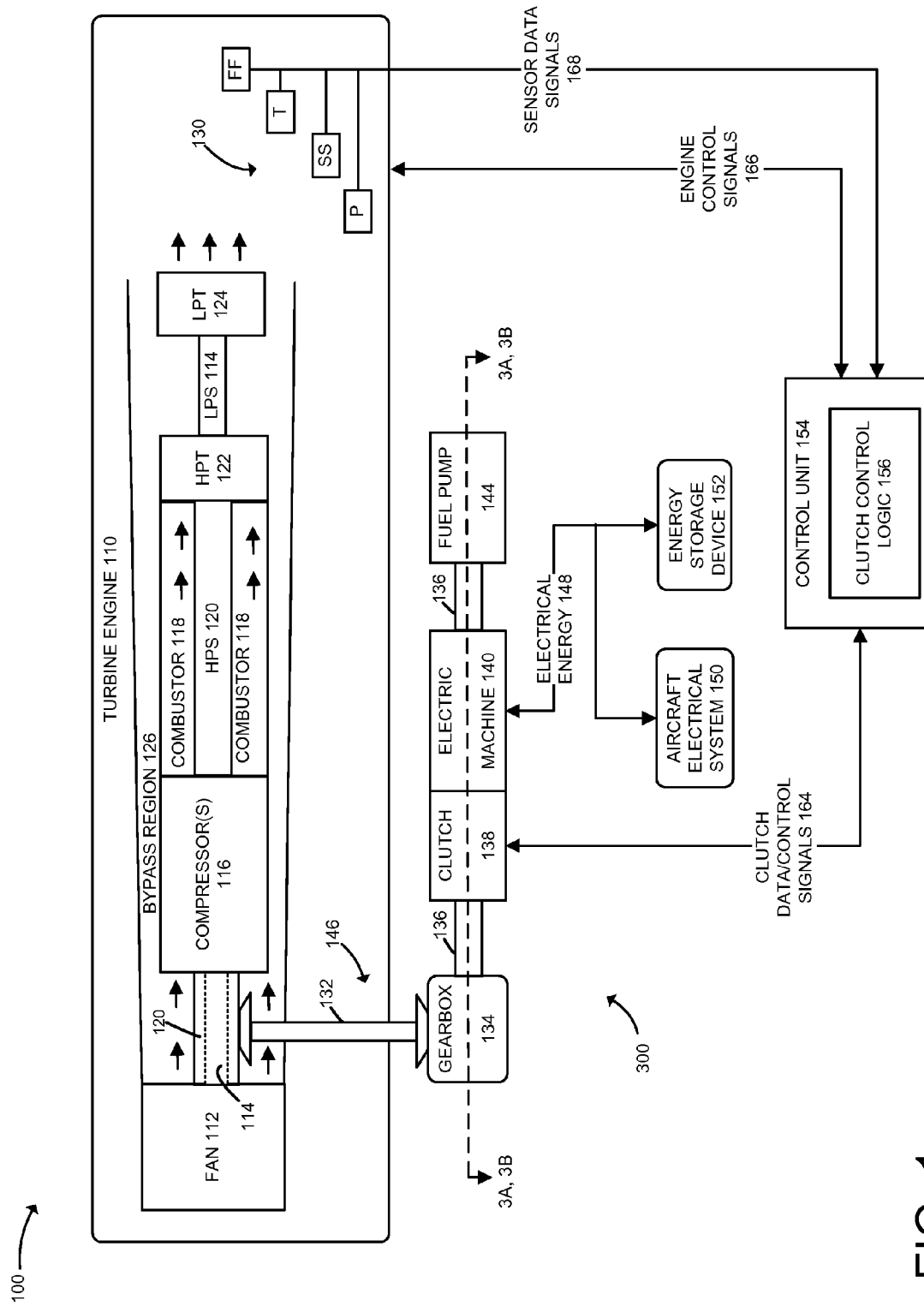
FIG. 1 is a simplified block diagram of at least one embodiment of a gas turbine engine system including an accessory subsystem in which an electric machine and a fuel pump can be selectively coupled or decoupled from a main drive of a turbine engine, as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Referring now to FIG. 1, embodiments of a gas turbine engine system 100 include a gas turbine engine 110, an accessory subsystem 300, and a control unit 154. In the illustrative accessory subsystem 300, a clutch 138 selectively couples and decouples an electric machine 140 and a fuel pump 144 from a main drive (e.g., a high pressure shaft or "HPS" 120) of the turbine engine 110 via a power take-off (PTO) assembly 146. The illustrative PTO assembly 146 includes an accessory-driving gear 132 and an accessory gearbox 134. In other embodiments, components of the accessory subsystem 300 may be embodied as a "more" electric engine rather than as a gearbox-driven power distribution system. While not specifically shown in the drawings, it should be understood that in more electric embodiments of the accessory subsystem 300, the clutch 138 selectively couples and decouples the electric machine 140 and the fuel pump 144 directly from a main drive of the turbine engine 110 (e.g., HPS 120), rather than via the accessory gearbox 134. That is, whereas in the illustrative embodiments, the electric machine 140 and the fuel pump 144 are mechanically coupled to the turbine engine 110 and to one another by the power take-off assembly 146, in other embodiments, the electric machine 140 and/or the fuel pump 144 may be directly or electrically coupled to a main drive of the turbine engine 110 (e.g., HPS 120), using more electric technology. Thus, aspects of the power management techniques disclosed herein can be used in connection with conventional fuel pumps that are mechanically driven by a main drive of the turbine engine 110 (via the PTO assembly 146), and can also incorporate newer, more efficient technologies of a more electric engine and electric fuel pumps.

The illustrative turbine engine 110 is a multi-shaft turbofan gas turbine engine configured for aerospace applications; however, aspects of the present disclosure are applicable to other types of turbine engines, including various types of turbofan and turboshaft systems, as well as turbine engines that are configured for other, non-aerospace types of applications. A fan 112 (e.g., a fan, variable pitch propeller, etc.) draws air into the turbine engine 110. In some embodiments, some of the air drawn into the turbine engine 110 by the fan 112 may bypass other engine components via a bypass region 126 (e.g., a bypass duct). The remaining air flows to one or more compressors 116. For instance, in some embodiments, a low pressure compressor may increase the pressure of air received from the fan 112, and a high pressure compressor may further increase the pressure of air received from the low pressure compressor. In any event, the compressor(s) 116 increase the pressure of the drawn-in air and forward the higher-pressure air to a combustor 118.

In the combustor 118, the pressurized air is mixed with fuel (e.g., gas), which is supplied to the combustor 118 by a fuel supply, e.g. the fuel pump 144. Typically, a flow meter, flow control valve, or similar device (e.g., a fuel flow sensor, FF) monitors and/or regulates the flow of fuel into the combustor 118. An igniter (not shown) is typically used to cause the mixture of air and fuel to combust. The high-energy combusted air is directed to one or more turbines 122, 124. In the illustrative embodiment, a high pressure turbine 122 is disposed in axial flow series with a low pressure turbine 124. The combusted air expands through the turbines 122, 124, causing the turbines 122, 124 to rotate. The combusted air is then exhausted through, for example, a propulsion nozzle (not shown), which may generate additional propulsion thrust.

The rotation of the turbines 122, 124 causes the engine shafts 114, 120 to rotate. More specifically, rotation of the low pressure turbine 124 drives a low pressure shaft 114, which drives the fan 112. Rotation of the high pressure turbine 122 drives the high pressure shaft 120, which drives the compressor(s) 116. In the illustrative embodiments, the shafts 114, 120 are concentrically disposed and independently rotatable. In other embodiments, the shafts 114, 120 may be parallel but not concentric. Further, a single shaft, or more than two engine shafts, may be provided, in other embodiments. For example, an intermediate shaft may be disposed concentrically between the low pressure shaft 114 and the high pressure shaft 120 to support an intermediate-pressure compressor and turbine.

Figure 3A:
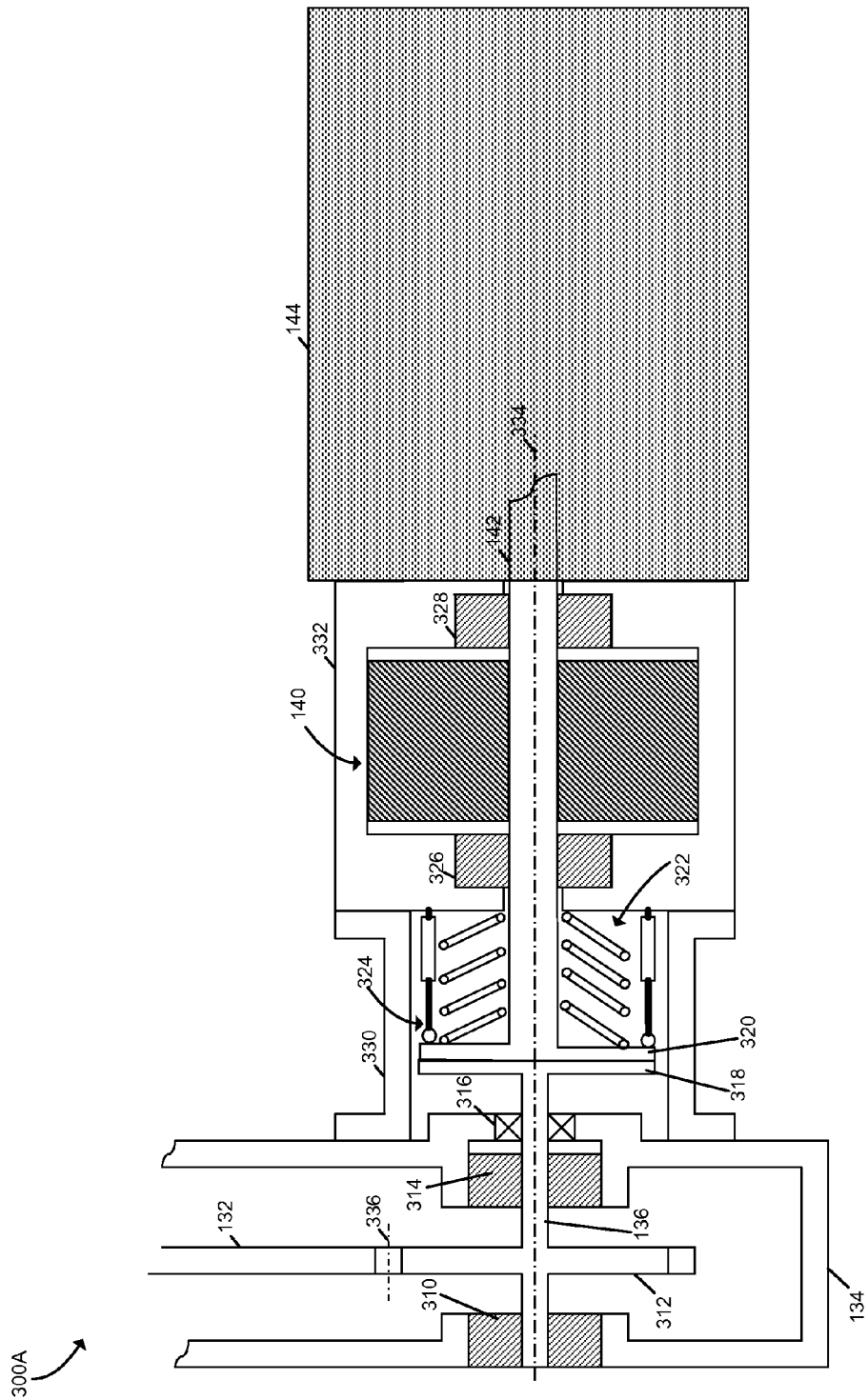
FIG. 3A is a simplified partial sectional view of a portion of the accessory subsystem of FIG. 1 cut along the plane 3A,3B-3A, 3B, with the clutch engaged.
Figure 3B:
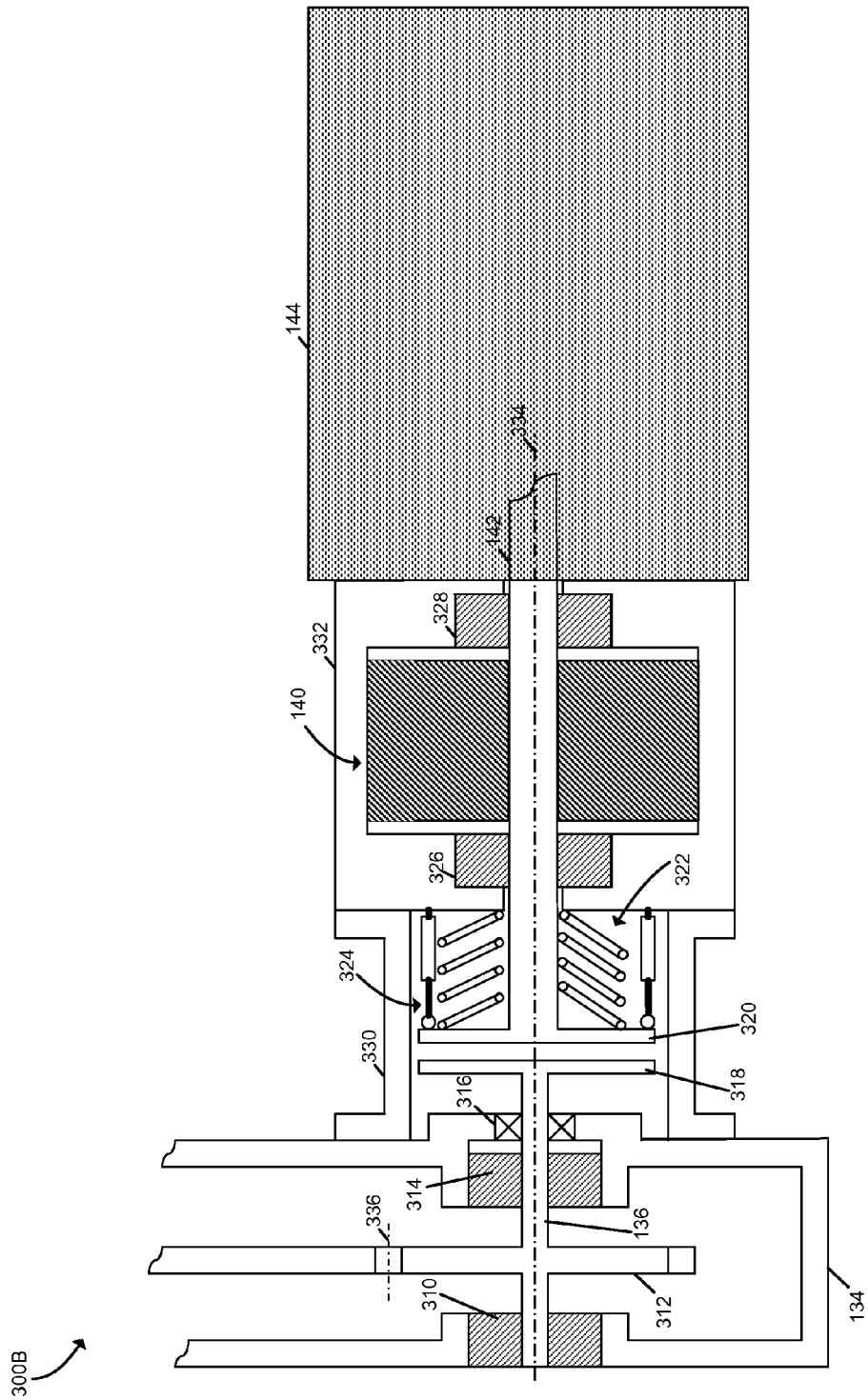
FIG. 3B is a simplified partial sectional view of the portion of the accessory subsystem shown in FIG. 3A, with the clutch disengaged.

When the clutch 138 is engaged, the turbine engine 110 can supply power to drive the electric machine 140 and the fuel pump 144. For example, power output by the turbine engine 110 (e.g., by the illustrative turbines 122, 124) can be supplied to the electric machine 140 or the fuel pump 144 by the power take-off ("PTO") assembly 146, which is powered by the turbine-driven rotation of the high pressure shaft 120. The illustrative PTO assembly 146 includes the accessory-driving gear 132, which is driven by rotation of the high pressure shaft 120. As shown in FIGS. 3A and 3B, described further below, the accessory-driving gear 132 is substantially coplanar with and intermeshes with an engine-driven gear 312 of the accessory gearbox 134.

Although the PTO assembly 146 is illustratively shown as coupled to the high pressure shaft 120, it should be understood that the PTO assembly 146 may be coupled to the low pressure shaft 114, or to another engine shaft, in other embodiments of the turbine engine system 100. Alternatively, embodiments of the PTO assembly 146 may be provided on multiple different engine shafts (e.g., on both of the shafts 114, 120), in order to support an additional number of electric machines 140.

The clutch 138 may be embodied as any suitable device that is capable of selectively coupling and decoupling two rotating shafts. For example, the clutch 138 may be embodied as a friction clutch or a brake. Among other things, the clutch 138 is configured to "fail engaged" in order to ensure that the fuel pump 144 and/or other components of the accessory subsystem 300 remain connected to the turbine engine 110 if an electrical failure occurs. The fuel pump 144 may be embodied as any suitable device that is capable of drawing fuel from a fuel supply (e.g., a fuel tank, not shown), and supplying pressurized fuel for delivery to the combustor 118 (e.g., by a fuel injector).

The electric machine 140 may be embodied as an electric generator, a motor/generator, a permanent magnet alternator (PMA), or another device that can generate electrical power by converting rotational power to electrical power. The illustrative electric machine 140 has a "generator" mode in which the electric machine 140 supplies electrical energy 148 to an aircraft electrical system 150 or to an energy storage device 152 at various times during operation of an aircraft driven by the gas turbine engine 110. The aircraft electrical system 150 can include in-cabin electrical systems, such as lighting and entertainment systems. The energy storage device 152 may be embodied as, for example, a battery or a capacitor. The electric machine 140 also has a "motor" mode in which it draws electrical energy from the energy storage device 152 and converts the received electrical energy into rotational power, which is then supplied to the turbine engine 110 via the power take-off assembly 146 when the clutch 138 is engaged. Thus, the electric machine 140 can act as a starter for the turbine engine 110, or support high power demands by the turbine engine 110, when the clutch 138 is engaged.

During operation of the turbine engine system 100, the clutch 138 can be disengaged to decouple the electric machine 140 and the fuel pump 144 from the main drive (e.g., HPS 120) of the turbine engine 110. When the electric machine 140 and the fuel pump 144 are decoupled from the turbine engine 110, the electric machine 140 can drive the fuel pump 144. As a result, the fuel pump 144 can run independently of the main drive (e.g., HPS 120) of the turbine engine 110. Among other things, operating the fuel pump 144 independently of the main drive (e.g., HPS 120) can allow the fuel pump 144 to run at close to optimal speeds when needed, while reducing the torque load on the turbine engine 110. When the fuel pump 144 is running at close to optimal speeds, the amount of fuel that is recirculated (e.g., by flowing to a spill valve and returning to the fuel tank) is reduced, and thus the amount by which the fuel temperature may increase due to the recirculation of the fuel is reduced.

When the clutch 138 is engaged after startup of the turbine engine 110, the arrangement of the gas turbine engine system 100 disclosed herein enables the electric machine 140 to add mechanical power to the main drive (e.g., HPS 120) of the turbine engine 110 or to extract mechanical power from the turbine engine 110 in order to create electrical energy that can be used to support the engine and aircraft accessories, such as the fuel pump 144 and the aircraft electrical system 150. The electric machine 140 may, from time to time, store some of the created electrical energy in the energy storage device 152.

During operation of the gas turbine engine 110, the clutch 138 can be controlled by clutch control logic 156, executed by the control unit 154, to selectively apply the electrical energy stored in the energy storage device 152 to operation of the fuel pump 144 or to the operation of the turbine engine 110, at various different operating points in the engine's power usage profile. For example, when the turbine engine 110 requires larger amounts of power (during takeoff or top-of-climb of the aircraft, for instance), the clutch control logic 156 may engage the clutch 138 and cause the electric machine 140 to operate in a motor mode, so that electrical power previously transferred by the electric machine 140 to the energy storage device 152 can be drawn from the energy storage device 152 by the electric machine 140 and used to deliver mechanical power to the turbine engine 110 (e.g., via the PTO assembly 146 and the HPS 120). Use of the electric machine 140 in this way can reduce the overall stress profile of the turbine engine 110 and extend engine life.

The illustrative control unit 154 is embodied as an electronic controller, processor, or control circuitry. In some embodiments, the control unit 154 may control the overall operation of the turbine engine 110. In other embodiments, the control unit 154 may simply control the operation of specific components of the turbine engine system 100 (such as the clutch 138 and/or the electric machine 140). The control unit 154 executes the clutch control logic 156 in order to control the operation of the clutch 138. For example, the control unit 154 may receive data signals from a sensor (such as a pressure switch) that is coupled to the clutch 138 from time to time, and may send control signals to the clutch 138 or to an actuator that is coupled to the clutch (such as an electrohydraulic or electromechanical actuator). These data and control signals are collectively illustrated in FIG. 1 as clutch data/control signals 164. The control unit 154 analyzes the data signals from the clutch 138 and signals from other components of the turbine engine system 100 (such as engine control signals 166 and sensor data signals 168 output by various engine sensors 130), and outputs control signals to selectively engage or disengage the clutch in accordance with the clutch control logic 156. The control unit 154 is also in electronic communication with the electric machine 140 and the fuel pump 144 to receive diagnostic signals and send control signals to these devices, although such communication links have been omitted from FIG. 1 for simplicity. For example, the control unit 154 may control the rate of fuel flow through the fuel pump 144 to the combustor 118 by sending electrical control signals to the fuel pump 144, and may control the operation of the electric machine 140 by sending electrical control signals to the electric machine 140. As another example, the control unit 154 may signal the electric machine 140 to operate in "motor" or "generator" mode based on a given set of sensed operating conditions of the turbine engine system 100.

In some embodiments, the control unit 154 executes clutch control logic 156 to balance and smooth the application of power by the gas turbine engine system 100 over the course of an aircraft mission. For example, the clutch control logic 156 may signal the clutch 138 to engage or disengage during the different operational phases (e.g., taxi, idle, takeoff, cruise, approach, thrust reverse) of the aircraft or based on current operating conditions of the aircraft. To do this, the control unit 154 may derive information about the current operational phase and/or the current operating conditions of the turbine engine system 100 from data signals provided by the sensors 130. In general, the sensors 130 are installed at various locations on the turbine engine 110 and/or other components of the turbine engine system 100 (e.g., the clutch 138, the electric machine 140, and the fuel pump 144), and are used to sense and/or measure various physical parameters such as temperature (T), shaft speed (SS), air pressure (P), and fuel flow (FF) during operation of the turbine engine system 100.

The clutch control logic 156 is embodied as electrical circuitry or as a processor-executable component, such as a computer program, module or set of machine-executable instructions embodied in non-transitory machine-readable storage media. The illustrative clutch control logic 156 controls the clutch 138 to provide a number of different modes of normal operation of the electric machine 140. In a first mode of normal operation, the clutch 138 is disengaged and the electric machine 140 powers the fuel pump 144, either electronically, acting as a generator (if the fuel pump 144 is electrically powered) or mechanically, acting as a motor (if the fuel pump 144 is mechanically driven). The clutch control logic 156 may cause the clutch 138 to disengage when, for example, the amount of power demanded by the turbine engine 110 is not very high. The clutch control logic 156 may assess the power demand by, for instance, comparing a data value representing the current power demand value to a threshold value. If the current power demand by the turbine engine 110 is less than the threshold value, the clutch control logic 156 may disengage the clutch 138 so as to decouple the electric machine 140 and the fuel pump 144 from the turbine engine 110.

When the clutch 138 is disengaged, the control unit 154 may control the electric machine 140 to slow down the pump speed of the fuel pump 144, in order to conserve energy (e.g., due to fuel being pumped out of the spill valve), or for other reasons. Alternatively or in addition, the electric machine 140 can control the pump speed of the fuel pump 144 to generate enough fuel pressure so that the fuel metering valve can accurately measure the fuel flow. To do this, the control unit 154 can analyze sensor data signals 168 (such as a fuel flow signal from a fuel flow sensor FF 130) and issue control signals to the electric machine 140 that, for example, increase or decrease the power supplied by the electric machine 140 to the fuel pump 144. Additionally, when the clutch 138 is disengaged, the electric machine 140 may draw electrical power from the energy storage device 152 and supply the electrical power to the fuel pump 144.

When the clutch 138 is engaged, thus connecting the electric machine 140 and the fuel pump 144 to the turbine engine 110, but the turbine engine 110 is not yet running, the electric machine 140 may act as a starter. When the turbine engine 110 is running and the clutch 138 is engaged, the fuel pump 144 may be powered by the turbine engine 110 (through the power take-off assembly 146) or by the electric machine 140. Also, when the clutch 138 is engaged, the electric machine 140 may draw electrical power from the energy storage device 152 and supply the electrical power to the turbine engine 110. Further, when the clutch 138 is engaged, the turbine engine 110 may power the electric machine 140, in which case the electric machine 140 can operate as a generator and may transfer electrical energy to the aircraft electrical system 150, to the fuel pump 144, and/or to the energy storage device 152.

Figure 2:
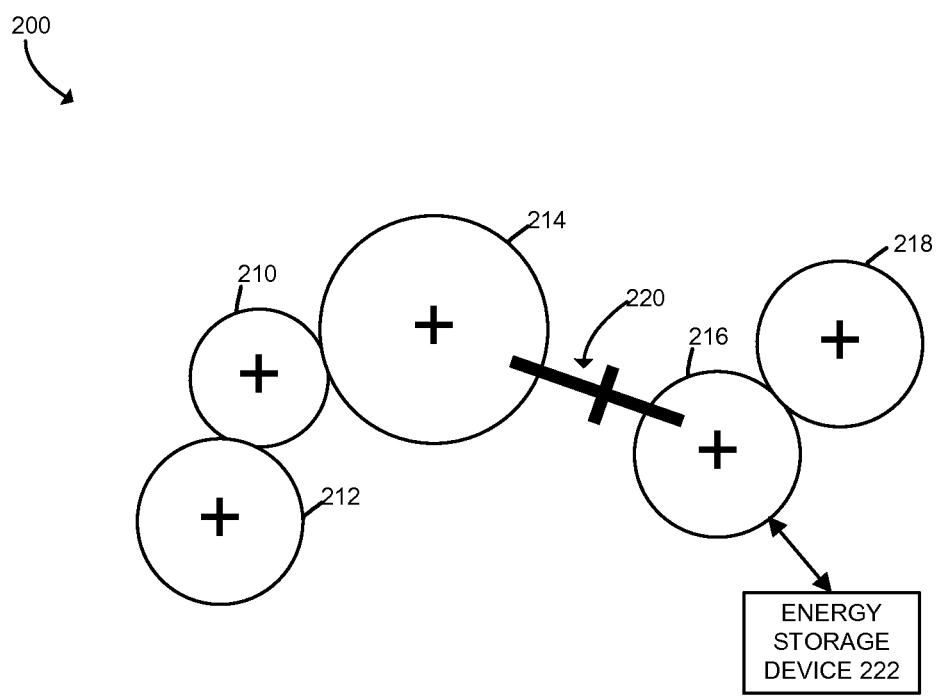
FIG. 2 is a simplified schematic diagram of a gearbox configuration for the gas turbine engine system of FIG. 1.

Referring now to FIG. 2, an embodiment 200 of a gearbox arrangement for the turbine engine system 100 is shown. In the arrangement 200, element 210 represents the turbine engine 110, element 212 represents an engine oil pump, element 214 represents the PTO assembly 146, element 220 represents the clutch 138, element 216 represents the electric machine 140, element 218 represents the fuel pump 144, and element 222 represents the energy storage device 152. It should be understood, however, that other suitable arrangements of the components shown in FIG. 2 are possible. For example, the position of the fuel pump 218 and the electric machine 216 may be reversed, in some embodiments, such that the fuel pump 218 rather than the electric machine 216 is coupled to the clutch 220.

Referring now to FIGS. 3A and 3B, embodiments 300A and 300B of the accessory subsystem 300 are shown, with FIG. 3A showing the clutch 138 engaged and FIG. 3B showing the clutch 138 disengaged. Components of the accessory subsystem 300 are housed in and supported by one or more casing structures 308, 330, 332, 338. In the accessory gearbox 134, the accessory-driving gear 132 intermeshes with and thereby drives the engine-driven gear 312, at 336. Rotation of the engine-driven gear 312 drives rotation of a PTO shaft 136. For example, in the illustrative PTO assembly 146, the driven gear 312 is fixed to and rotates with the PTO shaft 136. The PTO shaft 136 is supported by the casing 308, bearings 310, 314 and a fluid seal 316. The PTO shaft 136 is coupled to an engine-side clutch plate 318 of the clutch 138. A pump shaft 142 is coupled to an accessory-side clutch plate 320. The PTO shaft 136 and the pump shaft 142 rotate about a common axis of rotation 334. The electric machine 140 is supported by the pump shaft 142 and bearings 326, 328. The fuel pump 144 is supported by the pump shaft 142. The engine-side clutch plate 318 selectively engages with the accessory-side clutch plate 320 to couple the pump shaft 142 to the PTO shaft 136 and thereby cause the pump shaft 142 to rotate with the PTO shaft 136. The pump shaft 142 couples the electric machine 140 with the fuel pump 144. Thus, when the clutch 138 is engaged, the electric machine 140 and the fuel pump 144 are coupled to the turbine engine 110. Likewise, the electric machine 140 and the fuel pump 144 are decoupled from the turbine engine 110 when the clutch 138 is disengaged. As noted above, it should be understood that, while the drawings illustrate embodiments in which the electric machine 140 is positioned between the clutch 138 and the fuel pump 144 along the pump shaft 142, an opposite arrangement in which the fuel pump 144 is interposed between the clutch 138 and the electric machine 140 can be implemented in other embodiments and would work equally as well. Further, in the illustrated embodiments, the electric machine 140 and the fuel pump 144 are coupled to the clutch 138 by a single shaft, the pump shaft 142. However, the electric machine 140 and the fuel pump 144 may be driven by different shafts in other embodiments. For example, the pump shaft 142 may couple the fuel pump 144 to the clutch 138, and the electric machine 140 may be driven by a different shaft, which may be coupled to the pump shaft 142 by another clutch.

As shown in FIG. 3A, a spring 322 biases the clutch 138 to the engaged position. The spring 322 may be embodied as a compression spring or any other biasing mechanism capable of performing the functions described herein. As shown in FIG. 3B, an actuator 324 can be selectively actuated by the control unit 154 to compress the spring 322 and thereby release the clutch 138. The actuator 324 may be embodied as any type of electronic, hydraulic, pneumatic, or force-driven actuator capable of performing the functions described herein. For example, the actuator 324 may be embodied as a solenoid, a transducer, or any other mechanism that can convert energy into linear motion. The connection between the actuator 324 and the control unit 154 is omitted from the drawings, for simplicity.

Figure 4:
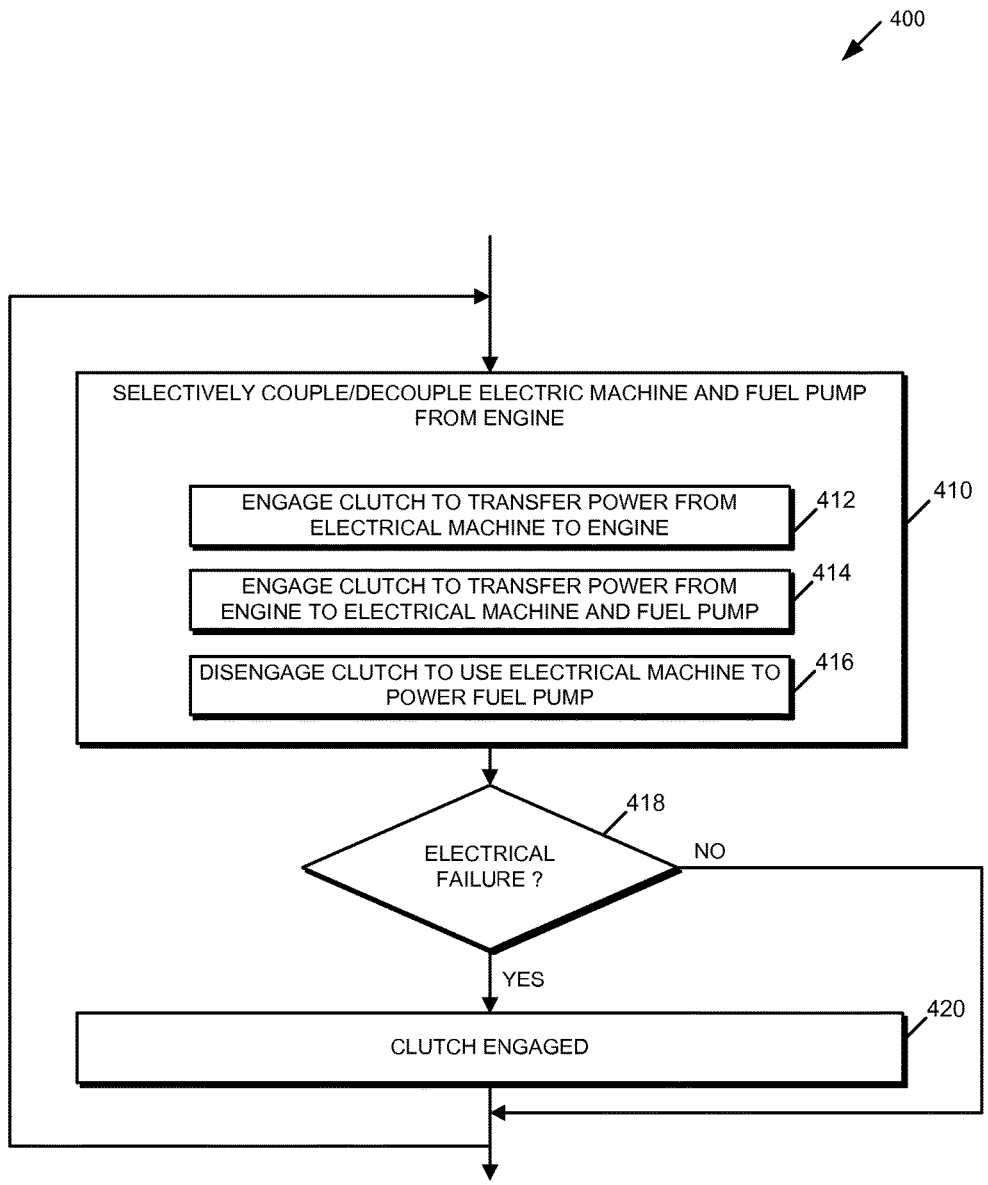
FIG. 4 is a simplified flow diagram of at least one embodiment of control logic for selectively coupling or decoupling an electric machine and a fuel pump from a drive of a turbine engine, which may be executed by the control unit of FIG. 1.

Referring now to FIG. 4, an illustrative process 400 that may be executed by the turbine engine system 100 (e.g., by the control unit 154) is shown. Aspects of the process 400 may be embodied as electrical circuitry, computerized programs, routines, logic and/or instructions, such as the clutch control logic 156. The illustrative process 400 can executed by the turbine engine system 100 in real time during normal operation of a turbine engine-powered vehicle or in an offline environment (e.g., during engine testing or aircraft maintenance).

At block 410, the turbine engine system 100 controls the clutch 138 to selectively couple and decouple the electric machine 140 and the fuel pump 144 from the turbine engine 110 as needed to achieve the desired operating results. To do this, the turbine engine system 100 may determine the current state of the clutch 138 (e.g., engaged or disengaged), compare the current state of the clutch 138 to the clutch state required by the current operating conditions or operational phase of the turbine engine 110, and then initiate a state change by the clutch 138 if there is a difference between the current clutch state and the clutch state associated with the current operating conditions or operational phase. The current operating conditions illustratively include the amount of power demanded by the turbine engine 110, and may also indicate a current phase of operation of the turbine engine 110 (which may be determined, for example, by turbine speed data and/or other parameters).

For instance, at block 412, the turbine engine system 100 may engage the clutch 138 to transfer electrical or mechanical power from the electric machine 140 to the turbine engine 110. At block 414, the gas turbine engine system 100 may engage the clutch 138 to transfer mechanical power from the turbine engine 110 to the electric machine 140 and/or the fuel pump 144. At block 416, the turbine engine system 100 may disengage the clutch 138 and use the electric machine 140 to electrically or mechanically power the fuel pump 144. To do this, the electric machine 140 may draw electrical energy 148 from the energy storage device 152 as needed. Execution of the functionality of any of the blocks 412, 414, 416 may be triggered by a determination of, or change in, the current operating conditions or operational phase of the gas turbine engine system 100.

At block 418, the turbine engine system 100 determines whether an electrical failure has occurred in the turbine engine system 100. To do this, the turbine engine system 100 (e.g., the control unit 154) may analyze one or more data signals received from the various components of the engine system 100 (e.g., one or more of the sensors 130). If an electrical failure has occurred, the turbine engine system 100 advances to block 420 to engage the clutch 138 as a "fail safe" measure. In this way, the clutch 138 engages to couple the electric machine 140 and the fuel pump 144 to the turbine engine 110 if an electrical failure occurs in the turbine engine system 100. If no electrical failure is detected at block 418, the turbine engine system 100 advances to the end of the process 400, and the process 400 returns to block 410 to continue selectively engaging and disengaging the clutch 138 as needed in response to changes in the operating conditions and/or operational phase of the turbine engine 110.

Figure 5:
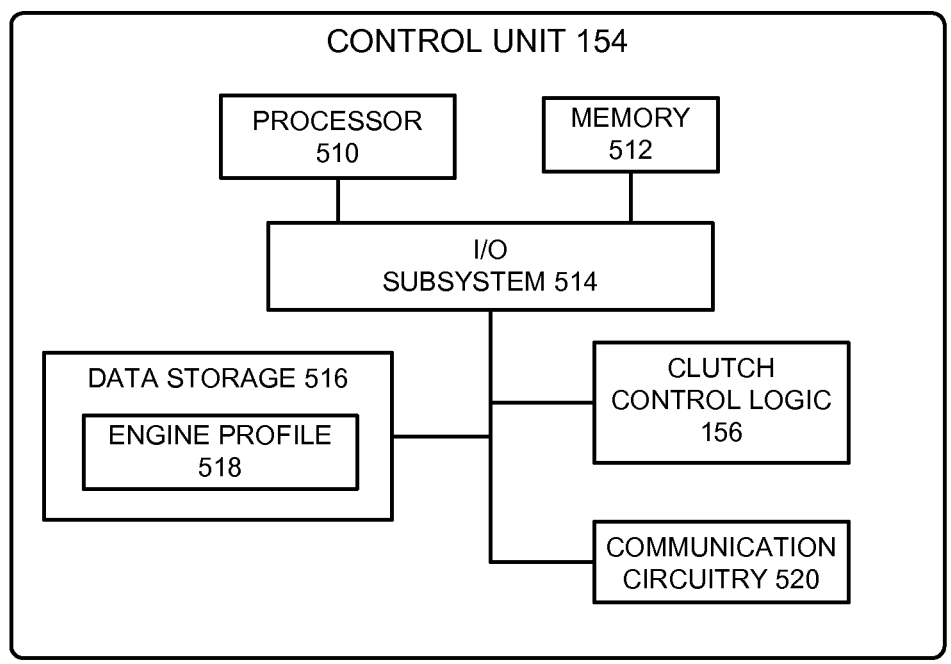
FIG. 5 is a simplified block diagram of at least one embodiment of the control unit of FIG. 1.

Referring now to FIG. 5, an embodiment of the control unit 154 is shown. The illustrative control unit 154 is embodied as one or more computing devices, which may include one or more controllers or processors (e.g., microcontrollers, microprocessors, digital signal processors, field-programmable gate arrays (FPGAs), programmable logic arrays (PLAs), etc.), and/or other electrical circuitry. The control unit 154 includes hardware, firmware, and/or software components that are capable of performing the functions disclosed herein, including the functions of the clutch control logic 156. The control unit 154 may be in communication with one or more other devices (such as a server computer) by one or more communication networks (not shown), in order to perform one or more of the disclosed functions.

The illustrative control unit 154 includes at least one processor 510, memory 512, and an input/output (I/O) subsystem 514. The I/O subsystem 514 typically includes, among other things, an I/O controller, a memory controller, and one or more I/O ports, although not specifically shown. The processor 510 and the I/O subsystem 514 are communicatively coupled to the memory 512. The memory 512 may be embodied as any type of suitable computer memory device (e.g., volatile memory such as various forms of random access memory). The I/O subsystem 514 is communicatively coupled to a number of hardware and/or software components, including a data storage device 516, communication circuitry 520, and the clutch control logic 156.

The data storage device 516 may include one or more hard drives or other suitable persistent data storage devices (e.g., flash memory, memory cards, memory sticks, and/or others). Information about the different operational phases and/or operating conditions of the turbine engine 110, and/or any other data needed by the turbine engine system 100 (e.g., the clutch control logic 156) may be stored in the data storage device 516 as engine profile data 518. For example, threshold data values, such as threshold levels of power demanded by the turbine engine 110, which may be used by the control unit 154 to determine the current operational phase of the gas turbine engine system 100, may be stored in the engine profile data 518. The engine profile data 518 may reside at least temporarily in other data storage devices of or coupled to the control unit 154 (e.g., data storage devices that are "in the cloud" or otherwise connected to the control unit 154 by a network, such as a data storage device of another computing device). Portions of the clutch control logic 156 may reside at least temporarily in the data storage device 516 and/or other data storage devices that are part of the control unit 154. Portions of the engine profile data 518 and/or clutch control logic 156 may be copied to the memory 512 during operation of the turbine engine system 100, for faster processing or other reasons. The clutch control logic 156 is embodied as one or more computer-executable components and/or data structures (e.g., computer hardware, software, or a combination thereof). Particular aspects of the methods and analyses that may be performed by the clutch control logic 156 may vary depending on the requirements of a particular design of the turbine engine system 100. Accordingly, the examples described herein are illustrative and intended to be non-limiting.

The communication circuitry 520 may communicatively couple the control unit 154 to one or more other devices, systems, or communication networks, e.g., a local area network, wide area network, personal cloud, enterprise cloud, public cloud, and/or the Internet, for example. Accordingly, the communication circuitry 420 may include one or more wired or wireless network interface software, firmware, or hardware, for example, as may be needed pursuant to the specifications and/or design of the particular turbine engine system 100. Further, the control unit 154 may include other components, sub-components, and devices not illustrated herein for clarity of the description. In general, the components of the control unit 154 are communicatively coupled as shown in FIG. 5 by electronic signal paths, which may be embodied as any type of wired or wireless signal paths capable of facilitating communication between the respective devices and components.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A turbine engine system for an aircraft, the turbine engine system comprising:
   a gas turbine engine;
   an electric machine coupled to the gas turbine engine;
   a fuel pump coupled to the electric machine;
   a clutch configured to selectively couple and decouple the electric machine and the fuel pump from the gas turbine engine; and
   control circuitry configured to: (i) disengage the clutch and cause the electric machine to power the fuel pump when the clutch is disengaged, (ii) engage the clutch and cause the electric machine to supply power to the gas turbine engine when the clutch is engaged, and (iii) engage the clutch and cause the gas turbine engine to supply power to the fuel pump and the electric machine when the clutch is engaged.

2. The turbine engine system of claim 1, comprising a gearbox coupled to the gas turbine engine, wherein the electric machine and the fuel pump are coupled to the gearbox by the clutch.

3. The turbine engine system of claim 1, wherein the clutch is coupled to the electric machine.

4. The turbine engine system of claim 1, wherein the clutch is coupled to the fuel pump.

5. The turbine engine system of claim 1, wherein the electric machine is arranged to transfer electrical energy from the gas turbine engine to an energy storage device.

6. The turbine engine system of claim 1, wherein the clutch, the electric machine, and the fuel pump are arranged for the fuel pump to be operable independently of the gas turbine engine.

7. A turbine engine system for an aircraft, the turbine engine system comprising:
a gas turbine engine;
an electric machine coupled to the gas turbine engine;
a fuel pump coupled to the electric machine; and
a clutch configured to selectively couple and decouple the electric machine and the fuel pump from the gas turbine engine after a startup phase of the gas turbine engine,
wherein the electric machine is arranged to transfer electrical energy from the gas turbine engine to an energy storage device,
wherein the electric machine is arranged to transfer electrical energy from the energy storage device to the gas turbine engine when the clutch is engaged.

8. The turbine engine system of claim 7, comprising control circuitry in communication with the gas turbine engine and the clutch, the control circuitry to control the clutch in response to a data signal received from the gas turbine engine.

9. The turbine engine system of claim 7, comprising control circuitry in communication with the gas turbine engine and the clutch, the control circuitry configured to engage the clutch in response to an electrical failure in the turbine engine system.

10. The turbine engine system of claim 7, comprising control circuitry in communication with the gas turbine engine and the clutch, the control circuitry configured to disengage the clutch in response to a data signal indicative of a level of power demanded by the turbine engine system being less than a threshold power level.

11. The turbine engine system of claim 7, comprising control circuitry in communication with the gas turbine engine and the clutch, the control circuitry configured to selectively engage and disengage the clutch based on a level of power demanded by the turbine engine system.

12. The turbine engine system of claim 7, wherein the electric machine is arranged to drive the fuel pump when the clutch is disengaged.

13. The turbine engine system of claim 7, comprising control circuitry in communication with the gas turbine engine and the clutch, the control circuitry configured to selectively control the clutch in response to a change in an operating phase of the turbine engine.

14. An accessory subsystem for a gas turbine engine, the accessory subsystem comprising:
a power take-off assembly drivable by a main shaft of the gas turbine engine;
a clutch coupled to the power take-off assembly;
an electric machine;
a fuel pump coupled to the electric machine; and
control circuitry configured to: (i) disengage the clutch and cause the electric machine to power the fuel pump when the clutch is disengaged, (ii) engage the clutch and cause the electric machine to supply power to the power take-off assembly when the clutch is engaged, and (iii) engage the clutch and cause the power take-off assembly to supply power to the fuel pump and the electric machine when the clutch is engaged,
wherein the clutch is arranged to selectively couple and decouple the electric machine and the fuel pump from the main shaft of the gas turbine engine.

15. The accessory subsystem of claim 14, wherein the clutch is connected to the electric machine.

16. The accessory subsystem of claim 14, wherein the clutch is connected to the fuel pump.

17. The accessory subsystem of claim 14, wherein the control circuitry is configured to control the clutch in response to a data signal received from the gas turbine engine.

18. The accessory subsystem of claim 14, wherein the control circuitry is in communication with the gas turbine engine and the clutch, the control circuitry is configured to engage the clutch in response to an electrical failure in the turbine engine system.

19. The accessory subsystem of claim 14, wherein the control circuitry is in communication with the gas turbine engine and the clutch, wherein the control circuitry is configured to engage and disengage the clutch in response to changes in a power level demanded by the gas turbine engine.

* * * * *